(12) United States Patent
Ramasubramanian et al.

(10) Patent No.: US 8,216,712 B1
(45) Date of Patent: Jul. 10, 2012

(54) ANODIZED METALLIC BATTERY SEPARATOR HAVING THROUGH-PORES

(75) Inventors: Murali Ramasubramanian, Fremont, CA (US); Robert Spotnitz, Pleasanton, CA (US)

(73) Assignee: Enovix Corporation, Freemont, CA (US)

( * ) Notice: Subject to any disclaimer, the term of this patent is extended or adjusted under 35 U.S.C. 154(b) by 670 days.

(21) Appl. No.: 12/339,400

(22) Filed: Dec. 19, 2008

Related U.S. Application Data (63) Continuation-in-part of application No. 12/013,398, filed on Jan. 11, 2008.

(51) Int. Cl.
*H01M 2/16* (2006.01)
*H01M 4/58* (2010.01)

(52) U.S. Cl. ........ 429/144; 429/145; 429/247; 429/251; 429/218.1; 429/231.95

(58) Field of Classification Search .................. 429/247, 429/248, 251, 142, 145, 146, 129, 137, 249, 429/231.8, 218.1, 231.5, 231.95; 427/126.2, 427/126.3; 428/304.4, 312.2, 325
See application file for complete search history.

(56) References Cited

U.S. PATENT DOCUMENTS

| | | | |
|---|---|---|---|
| 4,113,579 A | 9/1978 | Randall et al. | |
| 4,820,599 A | 4/1989 | Furukawa et al. | |
| 4,996,129 A | 2/1991 | Tuck | |
| 5,294,504 A | 3/1994 | Otagawa et al. | |
| 5,993,990 A | 11/1999 | Kanto et al. | |
| 6,432,585 B1 | 8/2002 | Kawakami et al. | |
| 6,432,586 B1 * | 8/2002 | Zhang | 429/251 |
| 6,498,406 B1 | 12/2002 | Horiuchi et al. | |
| 6,878,173 B2 | 4/2005 | Miyahisa et al. | |
| 7,056,455 B2 | 6/2006 | Matyjaszewski et al. | |
| 7,153,609 B2 | 12/2006 | Kubo et al. | |
| 2002/0034685 A1 | 3/2002 | Sato et al. | |
| 2006/0281007 A1 * | 12/2006 | Tsutsumi et al. | 429/246 |
| 2007/0172732 A1 | 7/2007 | Jung et al. | |
| 2007/0243460 A1 | 10/2007 | Carlson et al. | |
| 2010/0119939 A1 | 5/2010 | Misumi et al. | |
| 2011/0045168 A1 * | 2/2011 | Seo et al. | 427/58 |

FOREIGN PATENT DOCUMENTS

| | | |
|---|---|---|
| CA | 02388711 A1 | 5/2001 |
| JP | 2008153033 A | 7/2008 |
| JP | 2008153034 A | 7/2008 |
| JP | 2008153035 A | 7/2008 |
| JP | 2008153036 A | 7/2008 |
| WO | 2008072638 A1 | 6/2008 |

OTHER PUBLICATIONS

Lahiri, et al., co-pending parent U.S. Appl. No. 13/013,398, filed Jan. 11, 2008, and from which priority is claimed under 35 USC 120 as a continuation-in-part.

(Continued)

*Primary Examiner* — Raymond Alejandro
(74) *Attorney, Agent, or Firm* — Bryan Cave LLP

(57) ABSTRACT

A battery includes an anode and a cathode. An electrolyte material is disposed between the anode and the cathode. A separator is disposed between the anode and the cathode. The separator comprises an anodized metal oxide layer having substantially straight and parallel through-pores, wherein the anodized metal oxide of the porous anodized metal oxide layer is selected from the group consisting of aluminum oxide, titanium oxide, zirconium oxide, niobium oxide, tungsten oxide, tantalum oxide, and hafnium oxide.

14 Claims, 6 Drawing Sheets

OTHER PUBLICATIONS

Long et. al., "Three-Dimensional Battery Architectures," Chemical Reviews, (2004), 104, 4463-4492.

Nishizawa et al., "Template Synth of Polypyrrole-Coated Spinel LiMn2O4 Nanotubules and Props as Cathode Active Materials for Li Batteries," J.Electrochem.Soc., 1923-1927 (1997).

Shin et al., "Porous Silicon Negative Electrodes for Rechargeable Lithium Batteries," J. Power Sources, 139 (2005) 314-320.

Lehmann, "The Physics of Macropore Formation in Low Doped n-Type Silicon," J. Electrochem. Soc. 140 (1993), 10, 2836-2843.

Vyatkin et al., "Random and Ordered Macropore Formation in p-Type Silicon," J. Electrochem. Soc. 149, 1, G70-G76 (2002).

Van Den Meerakker et al., "Etching of Deep Macropores in 6 in. Si Wafers," J. Electrochem. Soc. 147, 7, 2757-2761 (2000).

P. Arora and Z. Zhang, "Battery separators," Chem. Rev., 2004, 104, 4419-4462.

Masuda, et al., "Ordered Metal Nanohole Arrays Made by a Two-Step Replication of Honeycomb Structures of Anodic Alumina," Science, New Series, vol. 268, No. 5216 (Jun. 9, 1995), pp. 1466-1468, USA.

* cited by examiner

ANODIZED METALLIC BATTERY SEPARATOR HAVING THROUGH-PORES

CROSS-REFERENCE TO RELATED APPLICATIONS

This patent application claims priority under 35 U.S.C. section 120 as a continuation-in-part to pending U.S. patent application Ser. No. 12/013,398, currently pending, entitled "Method to Fabricate A Three-Dimensional Battery with a Porous Dielectri Separator" and filed on Jan. 11, 2008, which is hereby incorporated by reference in its entirety.

FIELD OF THE INVENTION

The present invention relates generally to the field of battery technology, and more particularly to porous separators in battery structures and methods of manufacture thereof.

BACKGROUND

Batteries store or release electric charge that is generated from electrochemical reactions. An example of such a device would be a lithium-ion battery cell, which has three active elements: the anode, the cathode and the electrolyte. The cell also has an important electrically neutral fourth component, a separator between the anode and the cathode. For example, separators for conventional, planar lithium-ion batteries are typically solid micro-porous polyolefin films that are assembled in a sheet form and rolled in the form of a cathode/separator/anode/separator stack. This stack is rolled tightly and inserted into a can, filled with electrolyte, and then sealed. For example, reference to P. Arora and Z. Zhang, "Battery separators," *Chem. Rev.*, 2004, 104, 4419-4462, may help to illustrate the state of the art in battery separators, and is therefore incorporated by reference as non-essential subject matter herein.

Figure 1:
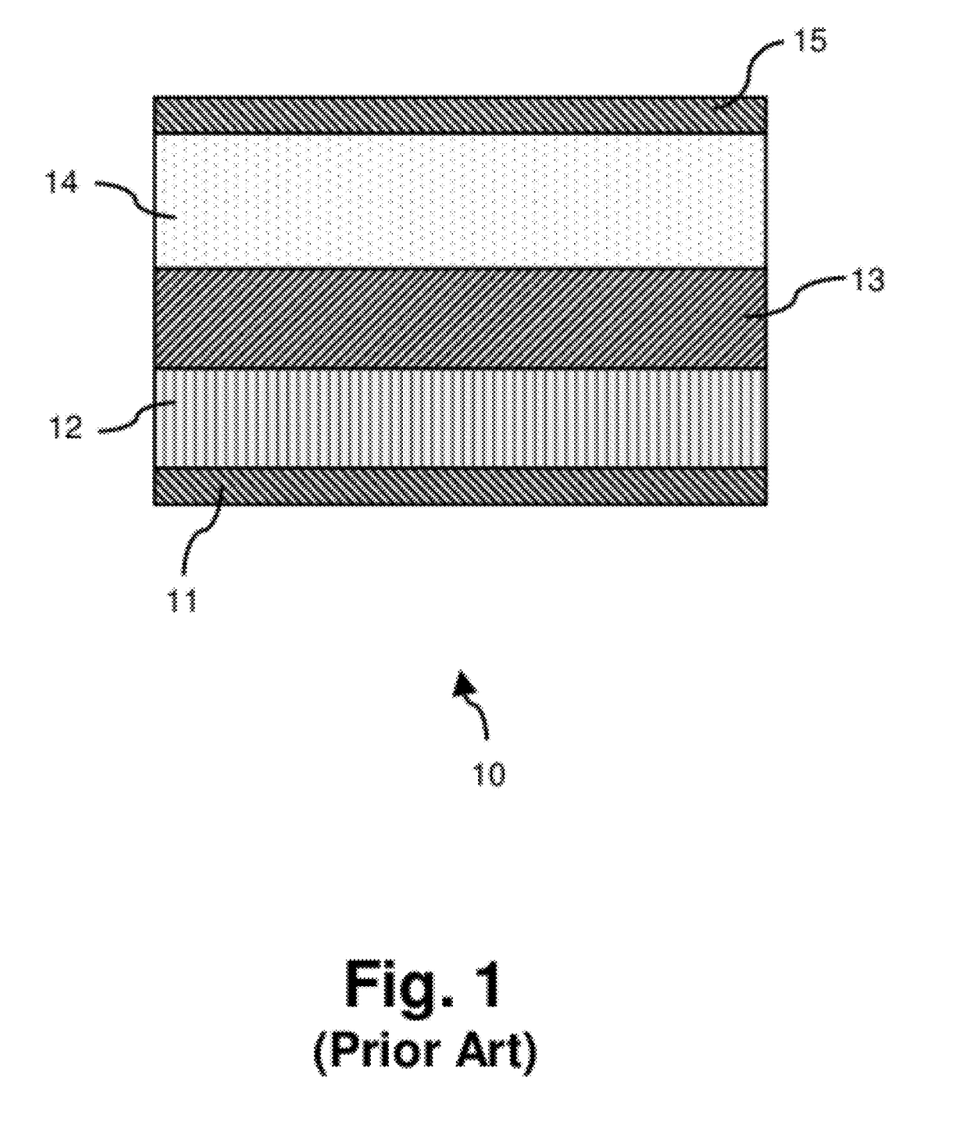
FIG. 1 is a cross section of a conventional lithium-ion battery cell.

FIG. 1 shows a cross sectional view of a conventional planar lithium-ion battery cell. The battery cell 10 has a cathode current collector layer 11 on top of which a cathode layer 12 is assembled. The cathode layer 12 is covered by a separator layer 13 over which an assembly of the anode layer 14 and the anode current collector layer 15 are placed. Note that the anode layer 14, the cathode layer 12, and the separator layer 13 are parallel. The cell 10 is then filled with an electrolyte that resides in the pores in the electrodes and the separator that serves as the transport medium for ionic movement between the anode layer 14 and the cathode layer 12. In a lithium ion battery, the electrolyte typically includes lithium. The current collectors 11, 15 are used to collect the electrical energy generated by the battery cell 10 and connect it either to other cells or to external devices. An external device can be electrically powered by the battery or provide electrical energy to the battery during recharging.

The separator serves as the mechanical barrier between the two electrodes to prevent them from shorting, at the same time allowing for ionic transport through the electrolyte in the pores. Separators need to have good mechanical integrity and chemical inertness. They should also have well defined and consistent porosity and tortuosity in order to uniformly transport the ions between the electrodes. A variety of materials have been used as separators in batteries. Some examples of separator/battery combinations currently being used are: cellulose materials for alkaline and silver-zinc batteries; polyethylene-silica composite material for flooded lead acid batteries; glass fibers for recombinant lead acid batteries; hydrophilized polypropylene for nickel-metal hydride batteries; and polyolefin porous separators in lithium-ion batteries. Other separators that have been used in different battery systems have included rubber, nylon, cellophane etc.

However, conventional separators that are made with polymers used in batteries suffer from some or all of the following limitations. In order to maintain mechanical integrity, the minimum functional separator thickness has to be significantly higher when using a polymeric or cellulose material than when using a more rigid material. This is generally undesirable since the separator does not take part in the electrochemical reaction, so that increasing its thickness degrades the battery's gravimetric and volumetric energy density. Also, polymeric separators may not have adequate resistance to puncture by metallic and particulate contamination. Improving the material toughness of a separator may significantly improve the safety of the battery from contamination related shorting during manufacture and also during battery operation. Polymeric separators may also have insufficient chemical and electrochemical stability in the battery environment. For example, some organic materials such as polyethylene oxide, when used in lithium ion batteries, undergo degradation at the high cathodic potentials. The separator degradation inherently limits the potentials to which the cathode can be charged to and thus limits the capacity one can achieve in lithium-ion batteries.

Thus, there is a need in the art for an improved separator for use in batteries that may give the battery longer life, improved stability or safety, and/or higher energy densities.

SUMMARY

A battery and related processes for battery manufacture are disclosed and claimed. The battery includes an anode and a cathode. An electrolyte material is disposed between the anode and the cathode. A separator layer is disposed between the anode and the cathode. The separator layer includes a plurality of through-pores. The separator layer comprises an anodized metal layer.

DETAILED DESCRIPTION

Existing batteries typically have two-dimensional laminar architectures (e.g., planar or spiral-wound laminates) with a surface area of each laminate being roughly equal to its geometrical footprint (ignoring porosity and surface roughness). In contrast, a three-dimensional energy storage device can be one in which an anode, a cathode, and/or a separator are non-laminar in nature. For example, if electrodes protrude sufficiently from a backplane structural layer to form a non-laminar active battery component, then the surface area for such a non-laminar component may be greater than twice the geometrical footprint of its backplane structural layer.

Three-dimensional batteries may have significantly higher energy densities than two-dimensional ones, and may provide a higher rate of energy retrieval due to reduced distances for electron and ion transfer between an anode and a cathode. Some examples of three-dimensional battery architectures that are capable of use with certain embodiments of the present invention may include three-dimensional interdigitated arrays of lithium ion insertion electrodes in the shape of pillars, plates, concentric circles, or waves. Other configurations, such as honeycomb structures and spirals might also be used with certain embodiments of the present invention. Such three-dimensional architectures may have cathodes and anodes protruding from the same backplane structural layer or from different backplanes.

Figure 2:
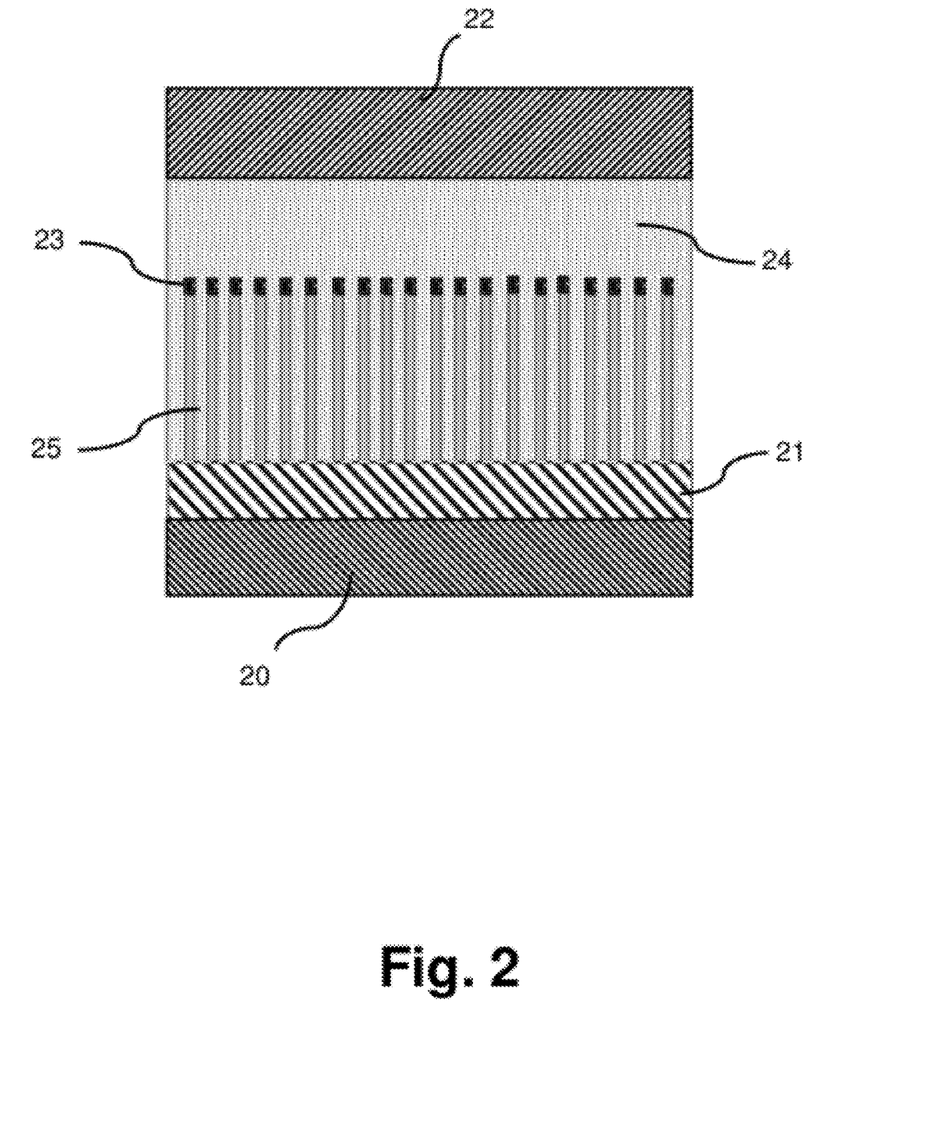
FIG. 2 is a battery cross section illustrating an anodization process according to an embodiment of the present invention.

Disclosed herein are porous anodized metal oxide separators that may be used in either two-dimensional battery cell architectures or three-dimensional battery cell architectures. For example, FIG. 2 shows an anodization cell illustrating an anodization process for a battery separator according to an embodiment of the present invention. The anodization cell consists of an anode 20 placed in electrical contact with the starting metal to be oxidized 21 together with a cathode 22. The anode 20 may comprise vanadium, carbon, silicon, aluminum, tin, or lithium titanate, for example. The metal to be anodized can either serve as the anode itself or can be deposited on top of another metallic or non-metallic substrate which acts as the base material. The cathode material can be any conductive material that can supports a cathodic reaction such as hydrogen evolution. Typical materials used are stainless steel, or nickel. An acid electrolyte solution 24 (typically oxalic, sulfuric, phosphoric, citric, etc. in the case of aluminum) is added to the cell.

An electrical potential may then be applied across the anode 20 and cathode 22, using a conventional external power supply (not shown in FIG. 2), at which time electrochemical anodization of the starting metal will commence and continue. The first reaction that occurs during the anodization process is the formation of a non-porous barrier layer 23 at the initial acid/metal interface. Next, surface pores form with approximately periodic spacing, and these surface pores become the template for pore growth/propagation in the porous anodized metal layer. Once initiated, the electrochemical anodization process may be stopped before the starting metal is completely consumed, or else run until all of the starting metal is anodized. For example, FIG. 2 illustrates a situation where the starting metal has been partially anodized. Preferably, the electrochemical anodization is continued until the porous anodized metal layer is of at least 100 nanometers thickness. Note that, in this embodiment, the process step of forming the plurality of pores through the starting metal is performed concurrently with the process step of electrochemical anodization of the starting metal, so that the anodization is used as a means to form the plurality of pores.

During formation of the pores 25, both the pore size and porosity may be varied independently of one another by varying process parameters such as voltage, acid concentration, temperature etc. For example, the resulting pores may have diameters on the nanometer scale. Since the barrier layer is insulating, pores 25 propagate due to electron transfer through the pores 25, and therefore propagate towards the base material in a substantially straight and parallel fashion. Since the resulting pore alignment is substantially towards the base material, the resulting porous metal oxide may be particularly suitable for use as a battery separator layer.

The fabrication of such a porous anodized metal oxide is beyond mere theory. For example, Masuda and Fukuda reported that aluminum may be oxidized to form a porous layer with well aligned pores on a nanometer scale. See Masuda, H., and Fukuda, K., "Ordered Metal Nanohole Arrays Made by a Two-Step Replication of Honeycomb Structures of Anodic Alumina," Science, Vol. 268, No. 5216 (Jun. 9, 1995), pp. 1466-1468. The usefulness of such a material in applications other than battery separators has been previously suggested, for example, in the structure of a nanowire supercapacitor (see e.g., U.S. Pat. No. 7,056,455 to Matyjaszewski, et al) or in a conventional electrolytic capacitor (see, e.g., U.S. Pat. No. 4,113,579 to Randall. Jr, et. al.).

Figure 3:
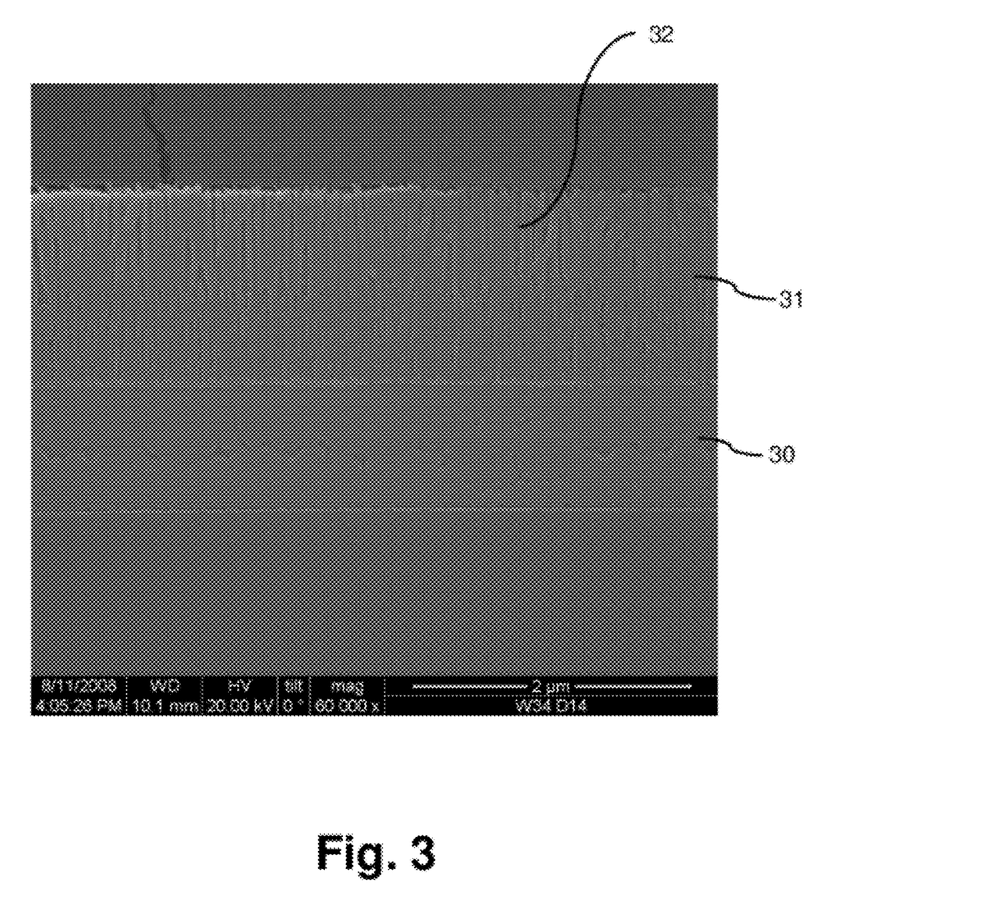
FIG. 3 is a cross sectional Scanning Electron Microscope image of a partially anodized aluminum film.

Also for example, FIG. 3 shows an example of a scanning electron microscopic image of a cross section of pores formed in a partially anodized aluminum film. The anodization depicted in FIG. 3 is partial because the starting metal has not been completely consumed. Rather, an aluminum layer 30 remains with an anodized oxide layer 31 being visible above the aluminum layer 30. One can see that the pores (e.g. pore 32) are aligned substantially towards the starting metal aluminum layer 30, and have a diameter on the order of a few tens of nanometers. Having pore diameters less than 100 nanometers, such an anodized material may be referred to as being a nano-porous anodized oxide (hereinafter, a "nano-PAO"). If the starting metal is aluminum, then the resulting material may be referred to as an anodized aluminum nano-pore material.

Still referring to FIG. 3, it is apparent that the structure of an anodized porous oxide film is distinctive, and therefore structurally distinguishable from porous metal oxide films formed by other manufacturing techniques. For example, an oxide powder may be used as a raw material to form a slurry with a binder, and then the slurry may be coated and dried onto a substrate. Porous metal oxide films may also be sintered in order to provide better particle-to-particle adhesion. The substrate may then be removed to form monolithic porous oxide films. In these cases, one of ordinary skill in the art can readily distinguish the porous metal oxide film that is formed from an oxide powder, from an anodized porous oxide film, based on the resulting structure of the film alone (e.g. from the pores as viewed in cross-section with the aid of microscopy. Moreover, the film comprising oxide powder has a thickness that cannot easily be reduced below the particle size.

The manufacture and integration of anodic oxide separators may be accomplished in several ways for various classes of batteries. For example, in a lithium-ion battery, a nano-PAO separator layer may be formed on top of an anode laminate (e.g. where the anode laminate has a graphite anode layer on top of a carbon, copper, or nickel current collector layer). The graphitic carbon may be compressed to form a coherent electrode. Such an electrode may then be coated with aluminum by using a vacuum process and/or by electroplating. The sandwich of anode and aluminum may then be subjected to electrochemical anodization in order to convert the aluminum into aluminum oxide ("alumina").

Figure 4:
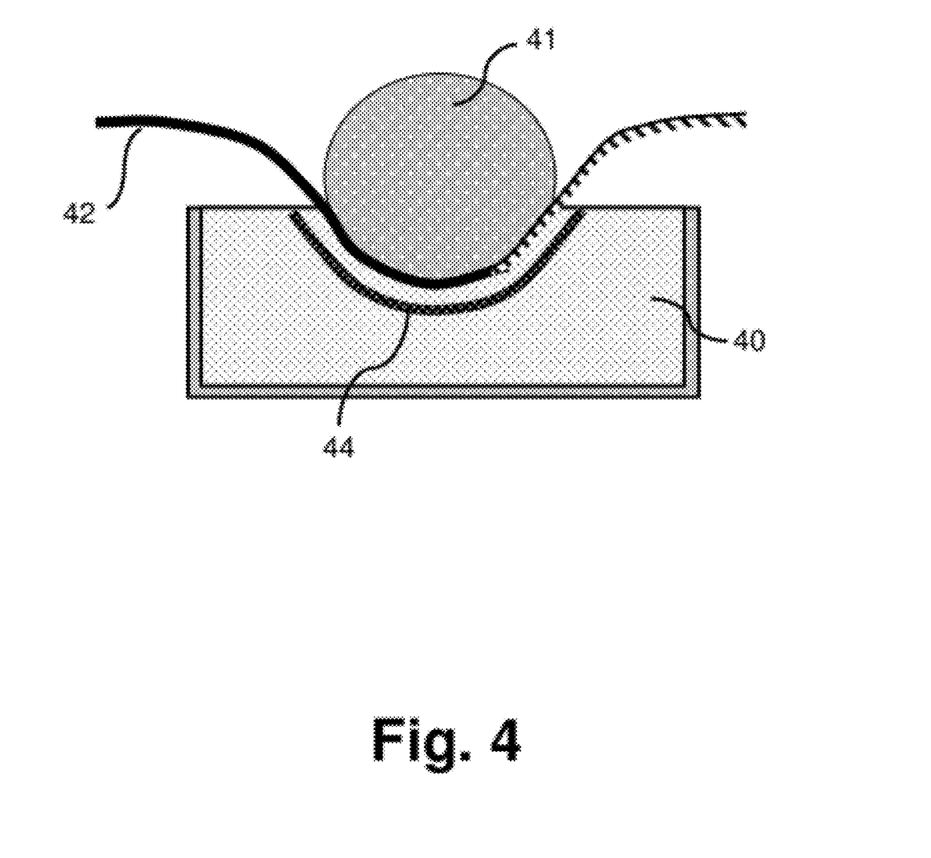
FIG. 4 is an illustration of a continuous anodized film formation process according to an embodiment of the present invention.

FIG. 4 is an illustration of a continuous anodized film formation process, according to an embodiment of the present invention that produces an anode-nano-PAO composite layer. In this process, acid electrolyte 40 comes into contact with a metal roll 41. The metal roll 41 is electrically and mechanically connected to the anode 42, and serves as a current supply pole for the anode 42. The anode 42 is a laminate including a battery anode current collector layer (which is adjacent and contacts the metal roll 41), the battery anode material layer, and a starting metal layer, with the battery anode material layer being disposed between the battery anode current collector layer and the starting metal layer. As the metal roll feeds the anode 42 into the electrochemical bath 40, the anodization reaction is initiated by the application of an electrical potential between the metal role 41 and the anodization cathode 44.

Still referring to FIG. 4, the starting metal in the layered stack partially or fully anodized (to form a porous anodized oxide) as the anode 42 is fed across the metal roll 41. For example, depending on the starting metal, the porous anodized oxide may comprise alumina, titanium oxide, zirconium oxide, silicon oxide, niobium oxide, tungsten oxide, tantalum oxide, or hafnium oxide. If the starting metal is aluminum, during anodization an alumina barrier layer is first formed on the aluminum, and then pores may be formed through the barrier layer. In certain embodiments, both the pore size and porosity may be controlled independently during anodization. The output from this process is a sheet including a battery anode current collector, a battery anode, and anodized alumina separator. This anode-separator composite sheet may be useful in subsequent battery assembly, with or without an additional polymeric separator. A similar process may be used to incorporate the separator on top of a coated cathode material provided the cathode material is stable in aqueous acidic systems.

According to another embodiment of the invention, a nano-PAO layer is used as a stand-alone separator in a battery. For example, in order to fabricate such a stand-alone separator, a film of aluminum may be partially anodized and then released as a standalone film by etching away the remainder of the starting metal. Also for example, a film of starting metal may be deposited on a base layer, and then the film of starting metal may be fully anodized and then released as a standalone film by etching away the base layer.

According to another embodiment of the invention, a nano-PAO separator may be produced on an existing polymeric separator, for example a separator layer including an organic material such as polypropylene, polyethylene, polyamide, polytetraflouroethylene, polyvinylidine fluoride, polyvinylchloride, polyimide, polycarbonate, or cellulose. Preferably the polymeric separator layer has a plurality of through-pores that extend all the way through its thickness. In certain embodiments, each of the plurality of through-pores preferably defines a through-pore diameter that is less than 100 nm.

A first metal layer (e.g. including aluminum) may be deposited on a first side of the porous polymeric separator layer. As part of this deposition step, a starting metal sub-layer of the first metal layer may first be deposited on the polymeric separator layer, for example by a vacuum deposition process, and then a thicker metal sub-layer may be deposited on the starting metal layer. Such a separator material combination may then be anodized using the process described above in order to obtain a dual-layer or multi-layered separator, with the nano-PAO layer then residing above or on the polymeric separator. Preferably, electrochemical anodization of the starting metal layer is continued until at least 100 nm of its thickness has been anodized. Alternatively, electrochemical anodization of the starting metal layer may be continued until its full thickness (e.g. 0.25 micron to 1 mm) has been anodized.

Optionally, the nano-PAO may be added onto the polymeric separator on one or both sides. Alternatively, a layer of one-sided nano-PAO polymer composite may be sandwiched with another polymeric separator, which would result in a tri-layer polymer-nano-PAO-polymer composite separator. This process may be practically integrated into existing two dimensional battery cell manufacturing lines.

Figure 5:
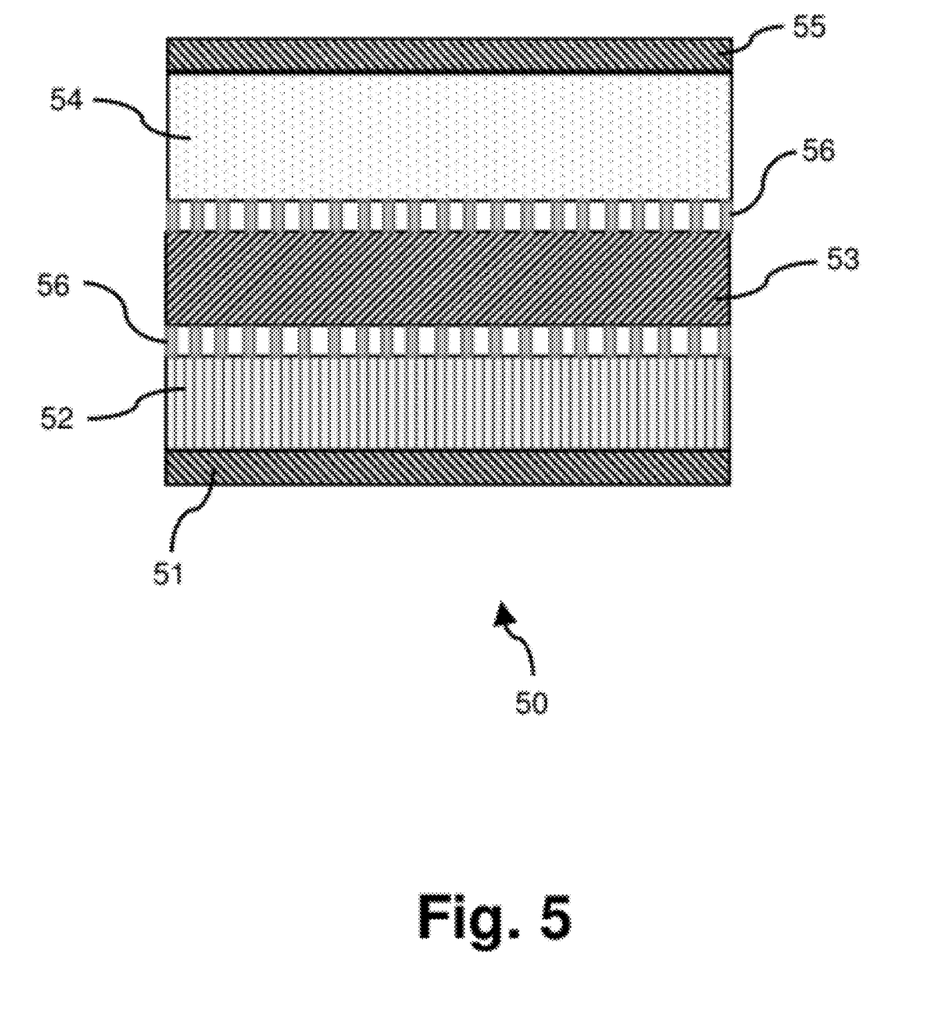
FIG. 5 is a cross section of a lithium-ion battery cell including a polymeric separator layer sandwiched between two nano-PAO separator layers, according to an embodiment of the present invention.

For example, FIG. 5 depicts a cross section of a lithium-ion battery cell 50 including a polymeric separator layer 53 sandwiched between two nano-PAO separator layers 56, according to an embodiment of the present invention. The lithium-ion battery cell 50 includes a cathode current collector 51 and cathode 52 beneath a trilayer separator comprising a nano-PAO 56 layer each side of a polyolefin separator layer 53. The anode 54 with the anode current collector 55 is assembled on top of the cathode & separator sandwich.

A three-dimensional battery architecture may be fabricated by depositing a conductive material on to an inactive backbone structure, for example in the shape of a plurality of fins, and then using electrophoretic deposition to deposit electrode material on to the conductive material to create a plurality of anodes and/or cathodes. The backbone structure may be optionally removed as part of or at the conclusion of the fabrication process, for example by etching. Alternatively, or in conjunction with this technique, a structural layer may be provided and then a plurality of protrusions can be formed that protrude from the structural layer. Each of the protrusions may include or may be provided with an electrically conductive surface, and an electrode layer may be deposited on the plurality of protrusions. For batteries that employ a three dimensional architecture, conventional roll-to-roll manufactured polyolefin separators cannot be easily integrated. Also, in three-dimensional battery architectures, a thinner separator may provide a much greater opportunity to increase energy and power density.

Figure 6:
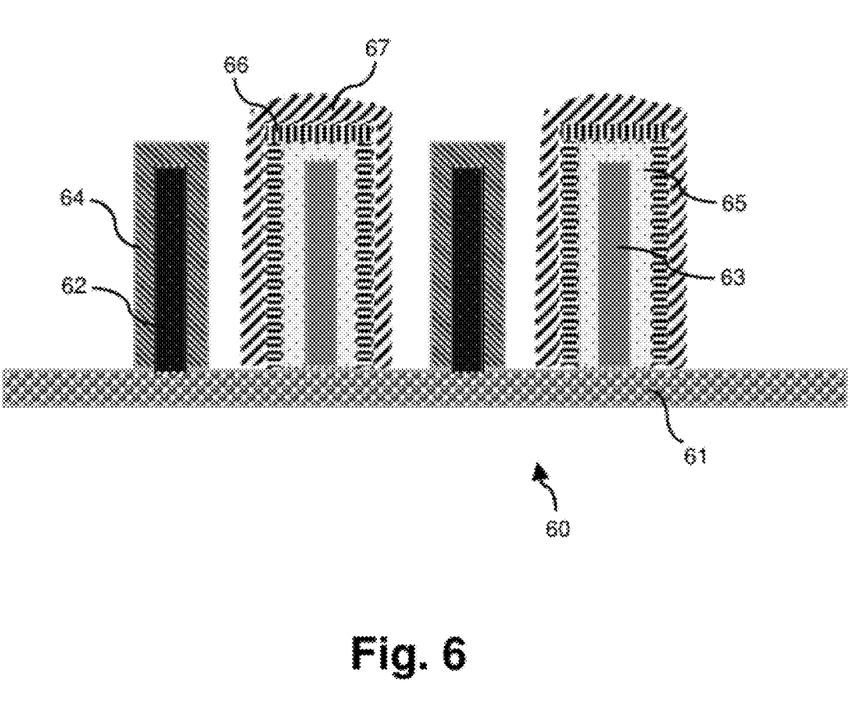
FIG. 6 is an illustration of a 3D battery including both polyolefin and nano-PAO separator layers, according to an embodiment of the present invention.

FIG. 6 is an illustration of a three-dimensional battery cell 60 including both polyolefin separator layers 67 and nano-PAO separator layers 66, according to an embodiment of the present invention. The battery cell 60 has cathode layers 64 and anode layers 65 that protrude from a common backplane structural layer 61 by at least 50 microns. Specifically, a cathode current collector 62 and an anode current collector 63 are each formed to protrude from the common backplane structural layer 61. For example, the current collectors 62 and 63 may themselves protrude from the backplane structural layer 61, or else the current collectors 62 and 63 may be layers that are deposited on an inactive backbone structure that protrudes from the backplane structural layer 61 (i.e. where the underlying backbone structure gives the current collector layers their protruding shape). Next, a cathode layer 64 is formed on the cathode current collector 62, and an anode layer 65 is formed on the anode current collector 63. A layer of separator starting metal is then deposited on top of the anode layer 65 (e.g. by a vacuum deposition process using a subtractive etch in the areas where the separator does not need to be present, and/or by electroplating). The starting metal layer is then anodized so as to become the nano-PAO separator layer 66. Optionally and additionally, a polyolefin composite 677 may be deposited on top of the nan-PAO separator layer, to form a bi-layer separator.

Certain embodiments of the present invention that include one or more nano-PAO layers may provide varied, atypical, and synergistic beneficial results in battery separator applications. For example, pore diameters less than 100 nanometers may provide additional protection from transport of particulate contamination between the electrodes that could potentially cause battery shorts. Furthermore, the low tortuosity obtained in these separators may also decrease the ionic resistance of the electrolyte. For example, ions may be able to move through the separator a less tortuous path between the electrodes, which may result in lower resistance and better cell performance. Moreover, the mechanical toughness and/ or thermal or mechanical stability of the separator may be improved, even at a reduced thickness relative to the prior art. Finally, the nano-PAO layer may also provide protection against dendrite formation during overcharge since the pore sizes may be much smaller than the size of the dendrites that occur in these batteries. Thus, the application of the structures and methods disclosed herein may provide varied, atypical, and synergistic beneficial results in battery separator applications.

In an alternative embodiment of the present invention, a sheet of starting metal that already has pre-existing through-pores is partially or completely anodized. Ionic transport would take place in the pre-existing gaps or through-pores between the mesh members, while the nano-pores that are formed in the anodized aluminum may be subsequently closed or sealed (e.g. using boiling water). For example, the starting metal sheet may take the form of a fibrous aluminum mat, porous foil, expanded mesh, or a grid, which is then anodized using the above-specified procedure to form a battery separator. For example, in certain embodiments the full thickness of the starting metal sheet may be in the range 10 to 1000 microns, and is preferably in the range 20 to 100 microns.

The anodization may be continued until all of the starting metal sheet has been anodized, or else the anodization may be partial so that a starting metal core is left inside the fibers, mesh members, or grid members. For example, in the case of a partially anodized aluminum mesh, the exterior of each mesh member will be coated with insulative (but relatively brittle) anodized alumina, while the interior of each mesh member will include an aluminum metal core (which is more flexible and malleable). Such a composite result combines beneficial electrical properties and beneficial mechanical properties. In certain embodiments, the pre-existing through-pores preferably have a diameter greater than 10 nm (e.g. to allow wetting by the electrolyte) but less than a full thickness of the starting metal sheet (e.g. to avoid electrical shorting between the anode and cathode, for example by electrode particles). The resulting structure may be used either by itself or in conjunction with a polyolefin material as a separator in a battery.

Batteries require a path for ionic transport via the electrolyte through the separator. Therefore, in embodiments of the present invention wherein the pores provide all or part of the ionic transport path for battery operation, the pores must be through-pores that include electrolyte. For example, if the anode is coated with an unbroken nano-PAO layer that serves as the separator, then the nano-pores in the nano-PAO layer must extend to the anode (or at least an electrically conductive extension of the anode) so that ionic transport is enabled by the electrolyte in the nano-pores. Alternatively, if the anodized layer covers a metal mesh material having through-gaps or through-pores having larger diameters than do the nano-pores, then the ionic transport may be facilitated by electrolyte in the larger diameter through-gaps or through-pores, so that the nano-pores may preferably be closed and/or blind pores rather than being through-pores.

While the invention has been described with reference to the specific exemplary embodiments thereof, it should be understood by those skilled in the art that various changes may be made and equivalents may be substituted without departing from the true spirit and scope of the invention as defined by the appended claims. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A battery, comprising:
   an anode;
   a cathode;
   an electrolyte material disposed between the anode and the cathode; and
   a separator disposed between the anode and the cathode, the separator comprising a porous polymeric layer and a porous anodized metal oxide layer, the pores of the porous anodized metal oxide layer consisting essentially of substantially straight and parallel through-pores having a diameter of less than 100 nm and extending through the entire thickness of the porous anodized metal oxide layer, wherein the anodized metal oxide of the porous anodized metal oxide layer is selected from the group consisting of aluminum oxide, titanium oxide, zirconium oxide, niobium oxide, tungsten oxide, tantalum oxide, and hafnium oxide, a portion of the electrolyte is disposed within the through-pores, the electrolyte material comprises lithium, and the anode comprises a material selected from the group consisting of vanadium, carbon, silicon, aluminum, tin, and lithium titanate.

2. The battery of claim 1 further comprising a first electrically conductive metal current collector electrically coupled to the anode, and a second electrically conductive metal current collector being electrically coupled to the cathode.

3. The battery of claim 1 wherein the anodized metal oxide layer comprises aluminum oxide.

4. The battery of claim 1 wherein the anode, the cathode, and the anodized metal oxide layers are parallel.

5. The battery of claim 1 wherein the battery further comprises a structural layer having a surface, and the battery comprises a plurality of anodes that protrude at least 50 microns from the structural layer surface.

6. The battery of claim 1 wherein the battery further comprises a structural layer having a surface, and the battery comprises a plurality of cathodes that protrude at least 50 microns from the structural layer surface.

7. The battery of claim 1 wherein the porous anodized metal oxide layer comprises an anodized aluminum nano-pore material.

8. A three-dimensional battery comprising a structural layer having a surface, anodes, cathodes, a separator and an electrolyte, wherein
   a plurality of electrodes protrude from the structural layer surface to a height of at least 50 microns from the structural layer surface, the plurality of electrodes comprising the anodes, the cathodes or a combination thereof;
   the separator is disposed between the anodes and the cathodes, the separator comprising a porous polymeric layer and a porous anodized metal oxide layer, the pores of the porous anodized metal oxide layer consisting essentially of substantially straight and parallel through-pores having a diameter of less than 100 nm and extending through the entire thickness of the porous anodized metal oxide layer, wherein the anodized metal oxide of the porous anodized metal oxide layer is selected from the group consisting of aluminum oxide, titanium oxide, zirconium oxide, niobium oxide, tungsten oxide, tantalum oxide, and hafnium oxide; and
   a portion of the electrolyte is disposed within the plurality of through-pores and the separator wherein the electrolyte material comprises lithium, and the anode comprises a material selected from the group consisting of vanadium, carbon, silicon, aluminum, tin, and lithium titanate.

9. The three-dimensional battery of claim 8 wherein the plurality of electrodes comprises anodes and cathodes.

10. The three-dimensional battery of claim 8 further comprising a first electrically conductive metal current collector electrically coupled to the anodes, and a second electrically conductive metal current collector being electrically coupled to the cathodes.

11. The battery of claim 8 wherein the anodized metal oxide of the porous metal oxide layer comprises aluminum oxide.

12. The battery of claim 8 wherein the separator further comprises two polymeric layers and the porous anodized metal oxide layer is sandwiched between the two polymeric layers.

13. The battery of claim 12 wherein the anodized metal oxide of the porous anodized metal oxide layer comprises aluminum oxide.

14. The battery of claim 8 wherein the separator comprises two porous anodized metal oxide layers and a polymeric layer sandwiched between the two anodized metal oxide layers, the pores of each of the porous anodized metal oxide layers consist essentially of substantially straight and parallel through-pores, and the anodized metal oxides of the two porous anodized metal oxide layers are selected from the group consisting of aluminum oxide, titanium oxide, zirconium oxide, niobium oxide, tungsten oxide, tantalum oxide, and hafnium oxide.

* * * * *